United States Patent [19]

Kasuga et al.

[11] Patent Number: 5,819,024

[45] Date of Patent: Oct. 6, 1998

[54] FAULT ANALYSIS SYSTEM

[75] Inventors: Tsutomu Kasuga; Etsurou Anzai, both of Yokohama, Japan

[73] Assignees: Hitachi, Ltd., Tokyo, Japan; Hitachi Software Engineering Co., Ltd., Kanagawa-ken, Japan

[21] Appl. No.: 678,071

[22] Filed: Jul. 10, 1996

[30] Foreign Application Priority Data

Jul. 11, 1995 [JP] Japan ................................. 7-175092

[51] Int. Cl.$^6$ ................................................ G06F 11/00
[52] U.S. Cl. .............................. 395/183.02; 395/183.22; 395/183.21
[58] Field of Search ..................... 395/183.21, 183.22, 395/183.02, 183.13, 183.14, 183.15, 182.13, 182.14, 183.01, 185.1

[56] References Cited

U.S. PATENT DOCUMENTS

| | | | |
|---|---|---|---|
| 4,108,360 | 8/1978 | Beismann et al. | 395/183.21 |
| 4,611,281 | 9/1986 | Suko et al. | 395/183.15 |
| 4,755,997 | 7/1988 | Takahashi | 395/183.22 |
| 4,949,252 | 8/1990 | Hauge | 395/183.21 |
| 5,038,348 | 8/1991 | Yoda et al. | 395/183.22 |
| 5,047,977 | 9/1991 | Hill et al. | 395/185.1 |
| 5,048,018 | 9/1991 | Bernstein et al. | 395/183.22 |
| 5,119,377 | 6/1992 | Cobb et al. | 395/183.21 |
| 5,165,036 | 11/1992 | Miyata et al. | 395/183.21 |
| 5,237,677 | 8/1993 | Hirosawa et al. | 395/183.22 |
| 5,283,891 | 2/1994 | Suzuki et al. | 395/183.21 |
| 5,335,341 | 8/1994 | Chana | 395/183.13 |
| 5,339,406 | 8/1994 | Carney et al. | 395/183.21 |
| 5,347,649 | 9/1994 | Alderson | 395/183.21 |

FOREIGN PATENT DOCUMENTS 3-27452  2/1991  Japan .............................. G06F 11/28

Primary Examiner—Joseph Palys
Attorney, Agent, or Firm—Fay,Sharpe,Beall,Fagan,Minnich & McKee

[57] ABSTRACT

A fault analysis system searches for a cause of a fault on the basis of dump data output to a dump file at the time of occurrence of the fault. When the fault analysis system is started, a CPU resource condition corresponding to each task is read from the dump data and is set in a CPU resource condition holding unit. A resource condition switching control unit automatically switches the CPU resource condition for reference and displays a memory content for each task. Upon termination or interruption of the analysis, a resource condition file input/output control unit stores the CPU resource conditions each corresponding to the tasks already used for reference in a resource condition file, and upon re-starting of a search, it re-sets the CPU resource conditions read from the resource condition file in the CPU resource condition holding unit.

2 Claims, 4 Drawing Sheets

FAULT ANALYSIS SYSTEM

FIELD OF THE INVENTION

The present invention relates to a fault analysis system, and particularly to a fault analysis system for effectively searching for a cause of a fault occurring in a computer system performing a multitask control on the basis of dump data output by the computer system at the time of occurrence of the fault.

BACKGROUND OF THE INVENTION

When a fault occurs in an operating computer system, a cause of the fault is searched for on the basis of dump data output by the computer system at the time of occurrence of the fault. More specifically, a direct cause of the fault has been examined by searching the memory contents corresponding to data/processing cords processed before the occurrence of the fault. In particular, for a computer system performing a multitask control, a search for the addresses of data, corresponding to each task, stored in a memory has been made on the basis of a CPU resource condition, including a PSW (Program Status Word), resisters and so forth corresponding to the task.

Usually, an analyst analyzes data regarding each task to search for a cause of a fault and searches for a CPU resource condition corresponding to the task on the basis of dump data stored in a dump file, in preference to all other searching procedures, to obtain addresses of the data in the memory, thus determining the cause of the fault by reference to the addresses of the data (Japanese Patent Laid-open No. Hei 3-27452 titled "Program Debugging System"). Specifically, in the prior art, a cause of a fault was manually searched for by an analyst. The analyst searches for a CPU resource condition corresponding to each task while checking dump data output to a display terminal or otherwise printed or recorded on paper. The search references the content of the memory under control of each of a plurality of tasks simultaneously executed by a multitask control directly before the occurrence of the fault.

SUMMARY OF THE INVENTION

When an analyst searches for a cause of a fault on the basis of dump data stored in a dump file, the above-described prior art exhibits the following problems.

Problem 1

To obtain a condition of each task, an analyst must manually search for a CPU resource condition corresponding to the task as well as the memory content managed by the task. This takes a lot of working time for each of the searching processes.

Problem 2

The prior art fails to examine the storage of the CPU resource condition for which an analyst manually searches as described in the paragraph "Problem 1". As a result, when the search is intended to be re-started after interruption for some reason, it must be repeated for the CPU resource condition completed for each search. The re-search also takes a lot of working time like the first search described in the paragraph "Problem 1".

An object of the present invention is to solve the above-described problems, and to provide a fault analysis system capable of shortening a working time required for searching for a cause of a fault on the basis of dump data output in a computer system performing a multitask at the time of occurrence of the fault and stored in a dump file, thereby determining a cause of a fault more rapidly and effectively than the prior art manner.

To achieve the above object, according to the present invention, there is provided a fault analysis system used for a computer system of a type in which a multitask control is performed for simultaneously processing tasks composed of a plurality of program units using a memory in common and dump data indicating a system condition are output to a dump file at the time of occurrence of a fault during operation. Specifically, the fault analysis system includes (1) a dump file read control unit; and (2) a memory/resource condition display unit. The system can further include (3) a CPU resource condition holding unit; and (4) a resource condition switching control unit, in addition to the units (1) and (2). The system can further include (5) a resource condition file input/output control unit, in addition to the units (1), (2), (3) and (4). The functions of the units (1), (2), (3), (4) and (5) are as follows.

1. Dump File Read Control Unit

This is adapted to read from a dump file, a CPU resource content corresponding to a specified task executed at the time of occurrence of a fault and a memory condition under control of the task.

2. Memory/resource Condition Display Unit

This is adapted to display the CPU resource condition and the memory content which are read from the dump file read control unit.

3. CPU Resource Condition Holding Unit

This is adapted to hold CPU resource conditions respectively corresponding to the tasks.

4. Resource Condition Switching Control Unit

This is adapted to be used, on the basis of the CPU resource content and the memory condition which are newly read from the dump file by the dump file read control unit, to set the CPU resource condition in the CPU resource condition holding unit, and to switch a CPU resource condition and a memory content to be displayed on the memory/resource condition display unit.

5. Resource Condition File Input/output Control Unit

This is adapted to execute any one of the following processings (a) and (b).

(a) Output all of the CPU resource conditions regarding the fault which are held in the CPU resource condition holding unit, to the resource condition file.

(b) Input all of the CPU resource conditions regarding the fault from the resource condition file and re-setting all of the inputted CPU resource conditions in the CPU resource condition holding unit.

The function of the fault analysis system having the above-described configurations will be described below.

The fault analysis system of the present invention is used for a computer system of a type in which a multitask control is performed for simultaneously processing tasks composed of a plurality of program units using a common memory. Dump data indicating a system condition is output to a dump file at the time of occurrence of a fault during operation. The fault analysis system includes the aforementioned dump file read control unit (1); and a memory/resource condition display unit (2). As a result, it is possible to eliminate the necessity of manually searching for a CPU resource condition corresponding to each task executed at the time of occurrence of a fault, and hence it is possible to shorten the working time required for searching for the content of dump data output at the time of occurrence of the fault and stored in the dump file. The system, therefore, can determine a cause of a fault more rapidly and effectively than in the prior art manner.

The fault analysis system can further include the aforementioned CPU resource condition holding unit (3) and resource condition switching control unit (4), in addition to the units (1) and (2). When a re-search for the memory content corresponding to the task for a once completed search is required, the system makes it possible to immediately search for information on the CPU resource condition corresponding to such a task by reference to the CPU resource holding unit, and hence to determine a cause of the fault more rapidly and effectively than the above system having only the units (1) and (2).

The fault analysis system can further include the aforementioned resource condition file input/output control unit (5), in addition to the units (1), (2), (3) and (4). Even when a search for a cause of the fault is intended to be re-started after interruption for some reason, the system makes it possible to reproduce the state of the CPU resource condition holding unit until the interruption is over and to continue the search, and hence to determine a cause of the fault rapidly and effectively like the system having the units (1), (2), (3) and (4) irrespective of whether or not the working is interrupted.

DETAILED DESCRIPTION OF THE PREFERRED EMBODIMENTS

Hereinafter, one embodiment of a fault analysis system of the present invention will be described with reference to the drawings.

Figure 1:
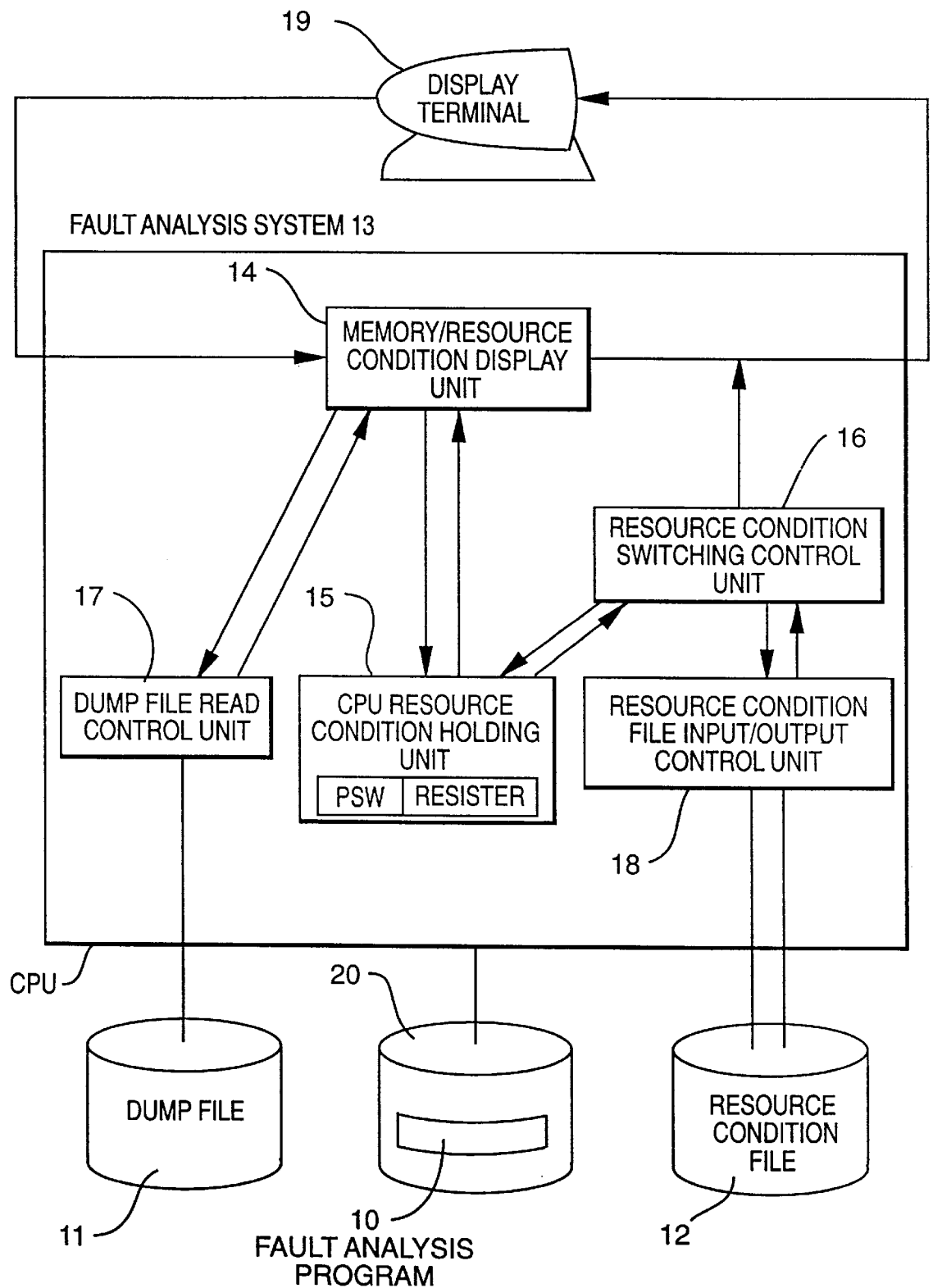
FIG. 1 is a block diagram showing a configuration of one embodiment of a fault analysis system of the present invention.

FIG. 1 is a block diagram illustrating a configuration of the embodiment of the fault analysis system 13 of the present invention, which in a preferred embodiment, is constituted by a combination of software 10 stored on a storage medium 20, such as a hard disk or other storage device, and hardware, such as a computer (CPU) that executes the software to perform the functions of the units of the system as set forth herein. The system includes a dump file 11 for storing dump data indicating a condition of the system at the time of occurrence of a fault. The dump data is loaded into the dump file in a conventional manner. The system also includes a resource condition file 12 for storing CPU resource conditions (described later) for each fault; and a display terminal 19. The fault analysis system 13 further includes a memory/resource condition display unit 14; a CPU resource condition holding unit 15; a resource condition switching control unit 16; a dump file read control unit 17; and a resource condition file input/output control unit 18.

Referring to FIG. 1, when the fault analysis system 13 is started, the dump file read control unit 17 searches for a CPU resource condition (including a PSW, the content of the general purpose resisters, and the content of the control registers) corresponding to a specified task executed at the time of occurrence of the fault, on the basis of the dump data stored in the dump file 11. The resource condition switching control unit 16 automatically sets the CPU resource content thus obtained in the CPU resource condition holding unit 15. An analyst makes reference to a memory condition and a CPU condition which are displayed on the memory/resource condition display unit 14 by means of the display terminal 19.

When searching for the condition of another task, a task list recorded in the dump file 11 is displayed on the display terminal 19 for selecting a target task from the task list. The resource condition switching control unit 16 searches for a CPU resource condition corresponding to the selected task in the same manner as described above, and automatically switches the setting of the CPU resource condition holding unit 15 on the basis of the CPU resource condition thus obtained. To terminate the fault analysis system 13, the resource condition file input/output control unit 18 outputs and stores, in the resource condition file 12, all of the CPU resource conditions corresponding to the tasks already used for reference. When the fault analysis system 13 is re-started, the resource condition file input/output control unit 18 inputs all of the CPU resource conditions thus stored from the resource condition file 12 and re-sets them in the CPU resource condition holding unit 15. Of the stored CPU resource conditions, the last one used for reference is automatically set in the CPU resource condition holding unit 15 by the resource condition switching control unit 16.

A format of a record used for managing plural kinds of CPU resource conditions obtained from dump data for each task will be described below.

Figure 2:
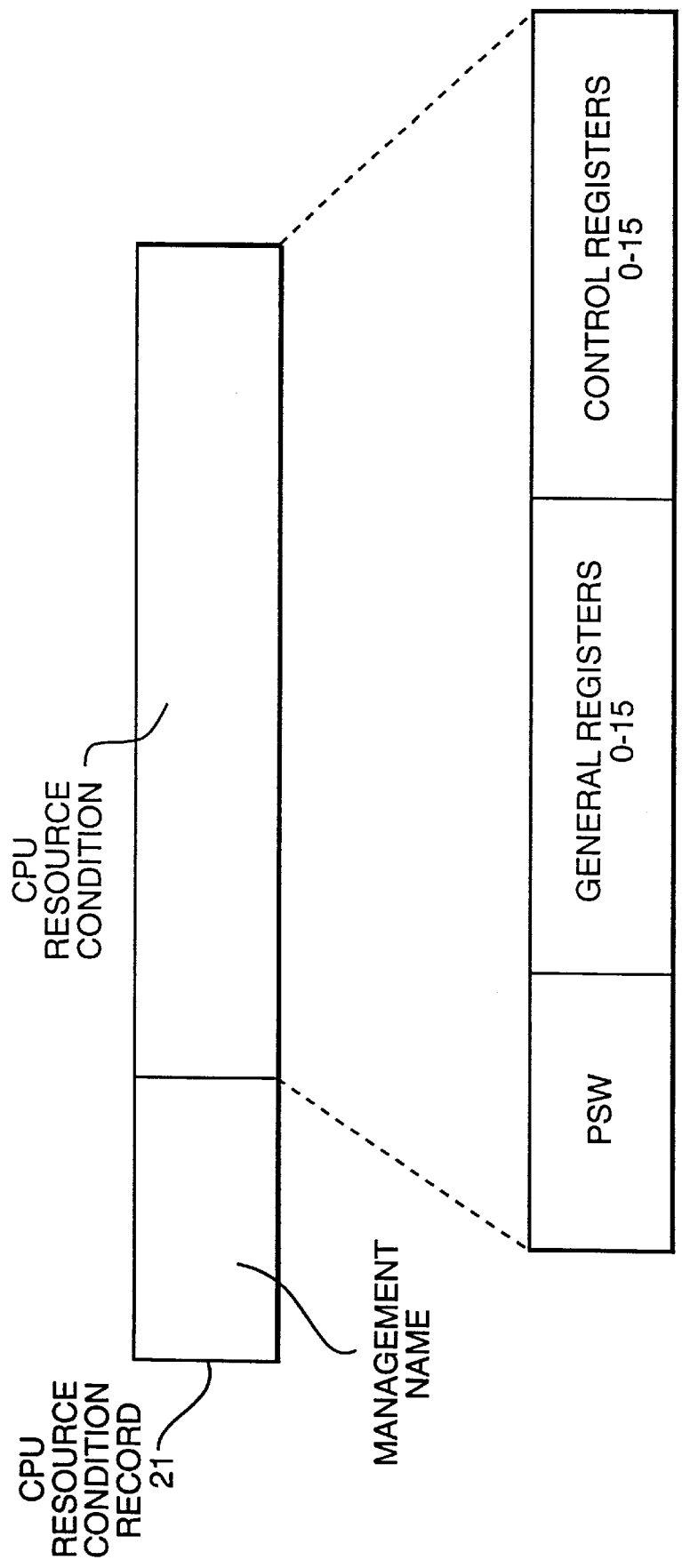
FIG. 2 is a diagram showing a format of a CPU resource condition record managed for each task in the system shown in FIG. 1.

FIG. 2 shows a format of the CPU resource condition record managed for each task in the system shown in FIG. 1. In this figure, the CPU resource condition record 21 has a content required for making reference to a memory content, which includes a PSW, general purpose registers No. 0 to No. 15 and control registers No. 0 to No. 15. In this embodiment, each CPU resource condition record 21 is added with a management name corresponding to each task, and is processed as one unit to be managed. A plurality of CPU resource conditions corresponding to a plurality of tasks are managed by a plurality of records as a CPU resource condition list 34.

Figure 3:
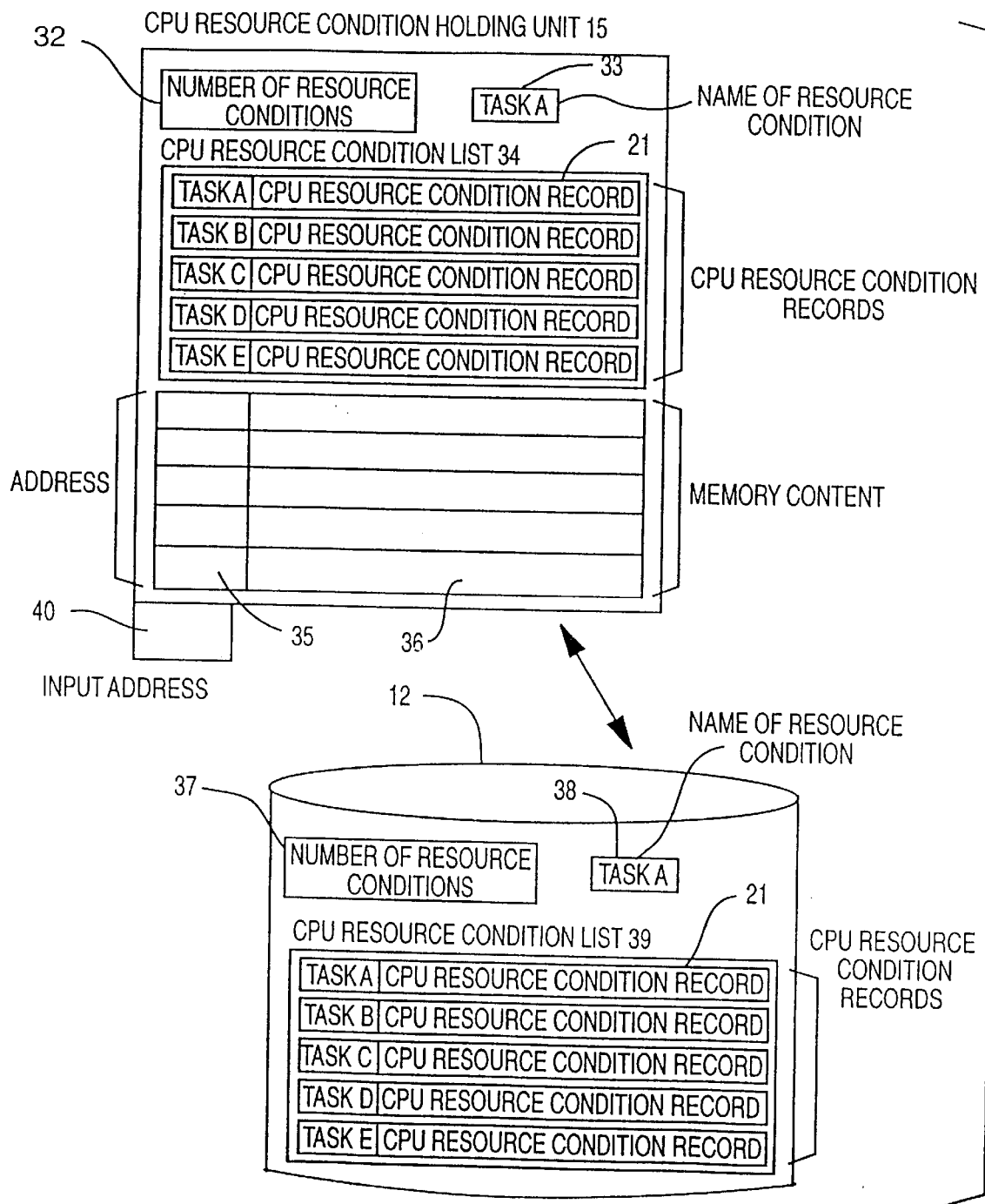
FIG. 3 is a diagram showing a relationship between information held in the CPU resource condition holding unit of FIG. 1 and information stored in the resource condition file.

FIG. 3 is a diagram illustrating a relationship between information stored in the CPU resource condition holding unit 15 of FIG. 1 and information stored in the resource condition file 12. In this figure, the CPU resource condition holding unit 15 collectively manages the CPU resource conditions corresponding to the tasks already used for reference, by means of a number 32 of the resource conditions and a name 33 of a resource condition (Task A is shown, for example) under the current reference, and a CPU resource condition list 34. On the other hand, when the fault analysis system 13 is terminated, the information in holding unit 15 is transferred as indicated by the arrow to the resource condition file 12 provided outside the fault analysis system 13. The information includes a number 37 of the resource conditions corresponding to a fault during analysis (the total number of the CPU resource conditions corresponding to the tasks used for reference), a name 38 of the resource condition used for final reference (the name of the task used for reference directly before termination (interruption) of the fault analysis system 13) and a CPU resource condition list 39 (the specific CPU resource condition corresponding to the specified tasks used for reference).

When the fault analysis system 13 is started at the time of occurrence of a fault in the absence of the resource condition file 12, a CPU resource condition corresponding to a task executed at the time of occurrence of a fault is added to the CPU resource condition list 34 as a CPU resource condition record 21, and "1" is set in the initial value of the number 32 of the resource conditions, while a specified management name specific to the CPU resource condition record 21 corresponding to the task is set in the name window 33 of the resource condition under the current reference. When an analyst switches the task for reference, a CPU resource condition record 21 corresponding to the switched task is newly added to the CPU resource condition list 34; a value of the number 32 of the resource conditions is incremented by one (+1); and a management name of the CPU resource condition corresponding to the task is set in the name 33 of the resource condition under the current reference. All of the contents, except addresses 35 and memory contents 36, in the CPU resource condition holding unit 15 set as described above are output and stored in the resource condition file 12 when operation of the fault analysis system 13 is terminated.

On the other hand, when the fault analysis system 13 is started at the time of occurrence of a fault in the presence of the resource condition file 12 or after an interruption is over, the content of the resource condition file 12 is copied to the CPU resource condition holding unit 15 (as indicated by the arrows), and the name 38 of the resource condition used for final reference in the resource condition file 12 is set in the name 33 of the resource condition under the current reference. Accordingly, the CPU resource condition at the time of interruption of the search can be completely recovered.

In summary, the object of the analysis is to retrieve from the dump file 11 the memory content for a specific task at the time of failure, e.g. the instruction code for the program that was running for that task and the variables that were used including tables, arrays etc. This is done by choosing the task entered, for example, through window 33, searching for the PSW for that task, which search is conducted by the analysis program, pointing with the PSW to the TCB (task control block), and extracting the general register and control register content from the dump file with the TCB and displaying this information as shown in FIG. 3. In addition, FIG. 3 shows the display of addresses 35 and corresponding memory contents 36. An address can be input through an address window 40, either directly or after being converted. From this displayed information, the memory content for that task at the time of failure is retrieved. Addresses 35 are obtained by conversion since the tasks may be performed according to different virtual memory maps and since the general register may point to a memory area that stores address information of another memory area in which the data array, table or other memory is stored.

Figure 4:
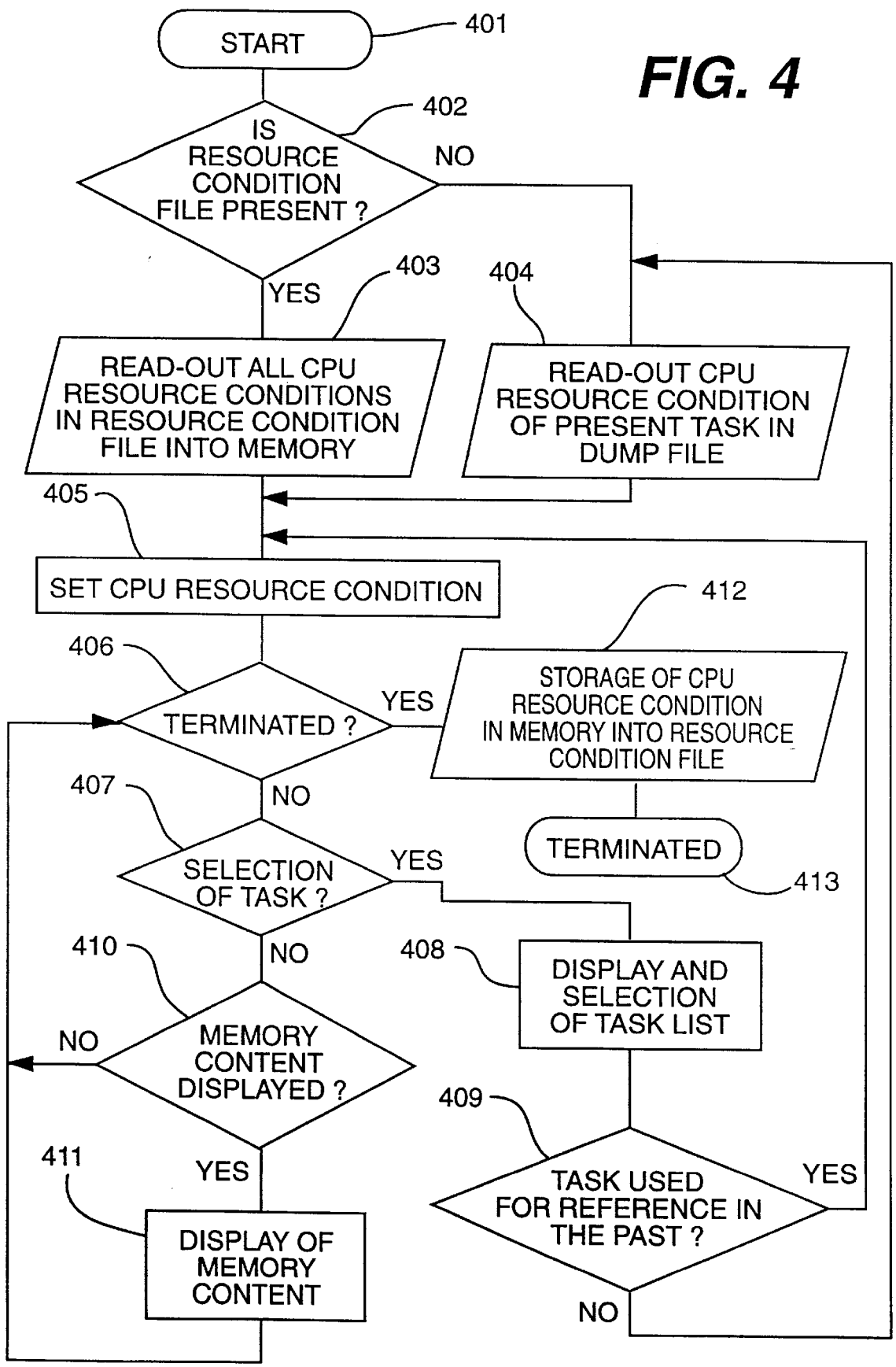
FIG. 4 is a flowchart showing procedures for searching for a cause of a fault in the case of using the system shown in FIG. 1.

FIG. 4 is a flowchart showing procedures of a search for a cause of a fault in the case of using the system shown in FIG. 1. In FIG. 4, when the fault analysis system 13 is started for fault analysis (step 401), if the resource condition file 12 is present (step 402=YES), the CPU resource condition stored in the resource condition file 12 is read (step 403), and the content thereof is set in the CPU resource condition holding unit 15 in a memory (step 405). On the other hand, if the resource condition file 12 is absent (step 402=NO), a CPU resource condition corresponding to a task regarding a fault, which is stored in the dump file 11, is read (step 404), and the content thereof is set in the CPU resource condition holding unit 15 in the memory (step 405).

An analyst displays the memory content corresponding to the task under the current reference on the display device 19 (step 411), and performs an analysis that searches for a cause of the fault. When another task is required for reference (step 407=YES), the task list is displayed for selecting the target task (step 408). When the task already used for reference in the past is selected (step 409=YES), since the CPU resource condition corresponding to the relevant task is already present in the CPU resource condition list 34, the CPU resource condition to be displayed is switched (step 405) by setting a management name specifying the CPU resource condition corresponding to the relevant task in the name 33 of the resource condition under the reference. When the selected task is not used for reference in the past (step 409=NO), the obtained CPU resource condition is newly added to the CPU resource condition list 34 in the CPU resource condition holding unit 15, and then a management name specifying the CPU resource condition corresponding to the relevant task is set in the name window 33 of the resource condition under the reference, to thus switch the task for reference (step 405). As used herein, switching between tasks includes changing the virtual memory conversion used to identify the actual memory address given in list 35, for example.

The analyst repeats the procedures from the steps 404 to 411 to execute the fault analysis required for searching for a cause of a fault. When the fault analysis work is terminated or interrupted (step 406=YES), all of the contents of the CPU resource conditions set in the CPU resource condition holding unit 15 are written and stored in the resource condition file 12 (step 412). Thus, when the search for a cause of a fault is re-started later, the stored CPU resource conditions stored in the resource condition file 12 can be used.

As described above, the fault analysis system of the present invention eliminates the necessity of manually searching for a CPU resource condition corresponding to each task executed at the time of occurrence of a fault, and hence shortens the working time required for searching for the content of dump data output at the time of occurrence of the fault. The system, therefore, can determine a cause of a fault more rapidly and effectively than in the prior art manner.

Further, since the fault analysis system includes a CPU resource condition holding unit and a resource condition switching control unit, it is possible to immediately search for information on the CPU resource condition corresponding to a task in an already completed search by reference to the CPU resource holding unit. Still further, since the fault analysis system includes a resource condition file input/output control unit, it is possible to reproduce the state of the CPU resource condition holding unit until the interruption is over and to continue the search, and hence to determine a cause of the fault regardless of whether or not the working is interrupted.

We claim:

1. A fault analysis system for a computer system which performs a multitask control for simultaneously processing tasks composed of a plurality of program units using a common memory in which dump data indicating a system condition is output to a dump file at the time of occurrence of a fault during operation, said fault analysis system comprising:

a dump file read control unit for reading from said dump file, a CPU resource condition corresponding to a specified task executed at the time of occurrence of a fault and a content of said memory under control of the task; and a memory/resource condition display unit for displaying the CPU resource condition and the memory content read by said dump file read control unit;

a CPU resource condition holding unit for holding CPU resource conditions each corresponding to tasks; and a resource condition switching control unit that, on the basis of the CPU resource condition and the memory content just read from said dump file by said dump file read control unit, sets the CPU resource condition in said CPU resource condition holding unit, and that switches a CPU resource condition and a memory content to be displayed on said memory/resource condition display unit.

2. A fault analysis system according to claim 1, further comprising:

a resource condition file input/output control unit for outputting all of the CPU resource conditions regarding the fault which are held in said CPU resource condition holding unit to a resource condition file; and for inputting all of the CPU resource conditions regarding the fault from said resource condition file as required and re-setting of all of the inputted CPU resource conditions in said CPU resource condition holding unit.

* * * * *